Inventors
JAROSLAW G. SIBAKIN
PAUL M. AUDETTE

Attorney 3,029,141
PROCESS FOR THE REDUCTION OF
IRON OXIDE
George J. Sibakin, Ancaster, Ontario, and Paul Michel
Audette, Burlington, Ontario, Canada, assignors to The
Steel Company of Canada, Limited, Hamilton, Ontario,
Canada, a company of Canada
Filed Mar. 21, 1960, Ser. No. 16,473
6 Claims. (Cl. 75—34)

This invention relates to the production of iron and steel. It is particularly directed to providing a process for the reduction, in the solid state, of the oxygen content of iron oxides, with concurrent increase in the iron content to produce an iron-iron oxide product suitable for use as feed for iron and steel making furnaces, cupolas and the like.

Processes are known in which iron oxide is reduced in the solid state to a lower state of oxidation, up to and including metallic iron, by direct reaction with a reducing agent such as, for example, carbon monoxide, in the presence of particles of a solid reducing agent such as carbon in the form of coal or coke fines.

Economic and operating problems are, however, encountered in the direct reduction, in the solid state, of iron oxide to a lower state of oxidation up to and including metallic iron. A rotating kiln type reactor in which ore, solid reducing agent and limestone are fed into one end and reaction product is discharged from the other end would appear to be, superficially, the most logical type of apparatus to employ from the point of view of its simplicity. The reaction is conducted at a sufficiently high temperature to obtain and maintain a satisfactory rate of reaction. This temperature may be, and usually is, approximate to that at which there is at least some fusion, with consequent sticking of particles of the charge. This causes particles of the charge to adhere to the wall of the reactor, thus reducing the effective cross section of the reactor and creating difficulties. Also, there may be, and usually is, agglomeration of particles of the charge into agglomerates of reduced iron, unreacted or partially reacted iron oxide, solid reducing agent, ash oxides and flux. This interferes with the reducing reaction and also creates discharging and other operating difficulties.

A further difficulty resides in the operation of the process. For example, iron ore usually contains, or is associated with, gangue material which contains, at least, small amounts of sulphur. Also, sulphur usually is present in the fuel used in the reducing reaction and the reduced product should have a low sulphur content. For example, when used as feed for steel making processes, the sulphur content should be less than about 0.05%. Thus, some provision should be made for obtaining and maintaining this low sulphur content. Limestone, calcium carbonate, has been used for this purpose but the manner in which it has been used has created a further difficulty in that the surfaces of the iron particles tend to become coated with a film of fused calcium oxide fines which may include calcium sulphide and/or calcium ferrite. The presence of this film adversely affects the reaction between the oxygen contained in the iron oxide and the carbon monoxide at the interfaces of the particles and tends to increase the sulphur content of the reduced iron product.

As a result of the above and other difficulties, technical progress in the reduction of iron oxide in the solid state to a lower state of oxidation, up to and including metal in elemental form, while the principle is not new, has been very slow, and few, if any, suggested processes have advanced beyond the experimental stage by reason of the operating difficulties encountered and the capital and operating costs involved in attempting to overcome them.

The product recovered from a reduction process subject to these operating difficulties may not satisfy the metallurgical requirements for iron and steel making furnaces. Also, in some cases further beneficiation treatment or the like may be and usually is required which adds to the cost of the process.

We have found that problems encountered in the direct reduction of iron oxide in the solid state to a lower state of oxidation up to and including metallic iron can be overcome by employing iron oxide, solid reducing agent and dolomite and/or limestone particles within predetermined size ranges and conducting the reducing reaction in a reaction zone maintained under closely controlled, substantially uniform temperature conditions.

The operation of the process of this invention is described in detail hereinafter, reference being made to the accompanying drawing in which.

Like reference characters refer to like parts throughout the following description of the process and the accompanying drawing.

The iron oxide treated by the process of this invention preferably, but not necessarily, is in the form of a high purity ore or concentrate. Impurities, other than oxidizable impurities, such as sulphur, which can be votatilized during a preliminary roasting or sintering step, are not eliminated during the process. If undesirable impurities are present in the starting material, they must be reduced to an acceptable content either before or during some preliminary treatment, such as roasting, or other conventional or unconventional treatment.

Figure 1:
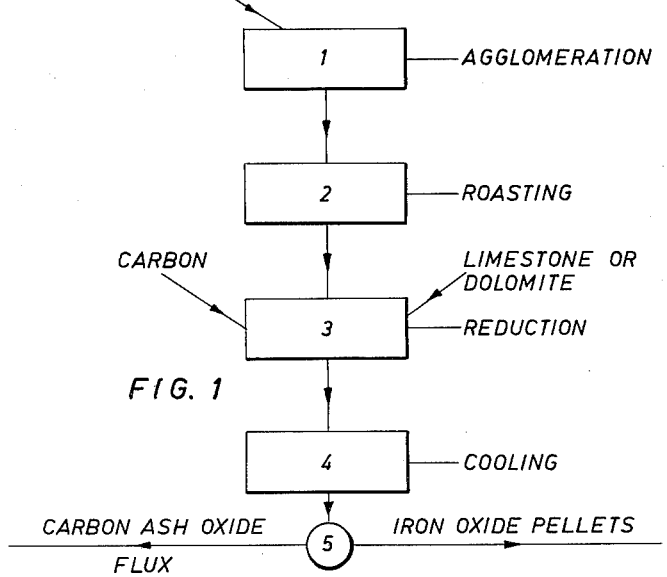
FIGURE 1 is a flow sheet of a preferred embodiment of the process.

Referring to FIGURE 1 of the drawing, the iron ore particles are formed into a desired shape such as pellets, or nodules, in agglomerating step 1. This step may be omitted if the ore, as received, is in the form of lumps of suitable size. The machine employed for this agglomeration step is a conventional pelletizing machine in which particles of ore are agglomerated into a desired shape and size. Conventional machines are available for this purpose. It is found, having regard to the desired rate of the reducing reaction and the extent of the reduction which can be obtained in an economically practical time period, that the iron ore, as received or as agglomerated into desired shape, should be at least about 6 mm. and preferably from about 6 to 15 mm., in size. That is, if the pellets are spherical, they should be at least about 6 mm. in diameter. If they are of any other shape, such as elliptical, the minimum dimension should be at least about 6 mm. The reason for this is to obtain an optimum volume of the particles relative to the surface area, thus to reduce the surface area exposed to contamination by sulphur from the fuel used in the reducing reaction and, also, the formation of an adhering film of flux, ash oxides and solid fuel fines. For satisfactory reduction within a reasonable time period, the maximum size is about 15 mm. With longer residence times, larger sizes may be used. It is found that iron oxide particles of less than about 6 mm. in size are not as satisfactory in view of the final sulphur content, the degree of reduction and possible gangue adherence.

The pellets are passed to roasting step 2 wherein they are roasted at a temperature sufficient to cause the iron oxide particles to bond together. Having regard to the nature of the gangue material associated with the iron oxide, this temperature usually is within the range of from about 1000° C. to 1500° C. Optimum temperature conditions can be readily determined for specific ores or concentrates. Preferably, the roasting step is conducted in the presence of a free oxygen containing gas, such as air, oxygen enriched air or oxygen. This step, which can be conducted in a conventional roasting furnace or on a moving conveyor, such as a sintering machine, serves several useful purposes. The iron oxide particles are bonded together into strong, coherent bodies which can be handled without danger of disintegration in subsequent steps of the process; any lower oxides of iron, such as magnetite, $Fe_3O_4$, are oxidized to ferric oxide, $Fe_2O_3$, and the sulphur content of the ore can be substantially eliminated as sulphur dioxide. The reduction of sulphur in this step is important as residual sulphur is carried through to the final product wherein the theoretical concentration, in complete reduction, is about 1.4 times that which is present in the roasted pellets.

Pellets from the roasting step 2 are passed to reduction step 3 wherein they are reacted with a reducing agent, such as carbon monoxide gas, in the presence of particles of carbon as a solid reductant, such as coal, preferably non-caking, or coke, and a fluxing agent such as limestone, $CaCO_3$, or dolomite, $(CaMg)CO_3$, preferably the latter. Dolomite particles are preferred as a flux in this step as they can be produced readily as particles within a predetermined size range, which particles have less tendency to spall or disintegrate than limestone particles during the reduction step. The reduction step preferably is conducted in a rotating kiln type furnace.

It has been found that the sizes of the particles of carbon and limestone or dolomite are important to the successful operation of the reduction step, particularly when it is conducted in a rotating kiln type furnace or other type furnace wherein the materials which form the charge mixture are tumbled and rolled continuously together. The particles of carbon, whether in the form of coal or coke, should be smaller than 12 mm. in order to have maximum surface area in contact with the exposed surfaces of the iron oxide pellets. There is no critical minimum size, but to minimize dust losses and for convenience in handling, particles within the range of from about 12 to 1 mm. are preferred as they expose large surface areas for the reducing reaction.

The particles of limestone and/or dolomite should be within the range of from about 1 to about 3 mm. in size. The presence of fines creates an operational difficulty in that at the temperature at which the reaction is conducted, they tend to adhere to the lining of the kiln and to exposed surfaces of the pellets. The limestone or dolomite should be provided in the charge mixture in amount at least about 4% by weight of the ore charge to ensure the presence of an excess of the theoretical amount required to combine with the sulphur contained in the reactants and the heating fuel.

The sequence of reactions which takes place includes the initial reactions between carbon and oxygen to produce carbon dioxide and carbon monoxide. Carbon monoxide reacts with the oxygen content of the iron oxide to form carbon dioxide, and the sequence of reactions is repeated. This sequence of reactions can be expressed by the following equations:

$$3C + 1\tfrac{1}{2}O_2 \rightarrow 3CO \qquad (1)$$
$$Fe_2O_3 + 3CO \rightarrow 2Fe + 3CO_2 \qquad (2)$$
$$3CO_2 + 3C \rightarrow 6CO \qquad (3)$$
$$Fe_2O_3 + 3C \rightarrow 2Fe + 3CO \qquad (4)$$

There are at least two zones in the reduction furnace, the heating zone into which the mixture of iron oxide, solid reductant and flux is charged and heated to reaction temperature and the reduction zone wherein reactions 2, 3 and 4 proceed to the desired extent. In this, it will be understood that while it may be theoretically possible to effect complete reduction of the iron oxide pellets to metallic iron, it has been found to be economically impractical to do this to produce feed material for iron and steel making furnaces. Rather, having regard to the reaction rate, the capital cost of equipment, and the cost of fuel, it is found that the process can be operated on a commercially practical basis to obtain a reduction of, for example, up to from 85 to 95% of the iron content to metallic iron, leaving some of the iron in the form of an oxide. Such a product is found to be suitable as feed for an iron or steel making furnace. The process is very flexible and the conditions of temperature and reaction time can be readily determined for the treatment of a specific ore to obtain the desired reduction having regard to economic factors and the requirements of the iron or steel furnace in which the product is to be used as feed material.

The temperature at which the reducing reaction is conducted is important in the operation of the process. We have found that a substantially uniform temperature should be maintained throughout the reduction zone of the kiln and that this temperature should be maintained within narrow minimum and maximum limits.

The maximum temperature which can be employed in the reducing reaction is determined primarily by the nature and amount of the gangue materials associated with the iron oxide in the pellets. The softening temperature of a specific iron ore, or mixture of iron ores, can be readily determined by conventional tests. The maximum temperature can then be determined at which the reaction can be conducted without fusion or incipient fusion at the surfaces of the pellets which would favour the formation of an adhering film thereon or of the sintering of the particles of the charge.

The primary purpose of the solid fuel in this process is that of a source of carbon for the carbon dioxide-carbon monoxide reaction. All or part of the heat required for the reaction may be produced from an extraneous source, such as by oil or gas from an axial burner and/or radial burners spaced at intervals along the length of the reactor. The remainder of the heat required for the reaction can be supplied by the solid carbon of the reaction mixture. The proportions of the heat requirements supplied by heat internally generated by the carbon of the charge and heat extraneously supplied is a matter of economic considerations and can be readily predetermined and closely controlled in the operation of the process. Thus, the temperature at which the reduction is conducted is closely controlled and maintained substantially uniform throughout the reduction zone and the development of local high temperatures at the surfaces of pellets is avoided.

The carbon content of the charge to the reactor is determined to provide that which is required for the reduction of iron oxide to iron, the proportion of heat to be supplied for the reaction from this source, and an excess to ensure the maintenance of a reducing atmosphere throughout the reactor.

The flux, lime or, preferably, dolomite, of a particle size as described above, is provided in amount in excess of the theoretical amount required to combine with the sulphur contained in the heating fuel and the reducing agent. As stated above, dolomite is preferred as a fluxing agent as the particles do not disintegrate and form fines during the reducing reaction to the same extent as limestone.

The maximum temperature which can be employed at any point in the reaction zone should be as close as possible to but safely below that temperature at which sticking of flux or ash oxides to surfaces of the pellets and to the lining of the kiln may occur and/or fritting of charge material may take place.

The rate of the reducing reaction varies directly with the temperature. Thus, while there is no critical lower temperature, the reaction is usually conducted at a temperature at which it proceeds at a reasonably rapid rate. An important advantage of this process is that by using reductant and flux particles within the described size ranges and by providing heat from an extraneous source, it is possible to maintain a substantially uniform temperature throughout the reaction zone which is approximate to, but safely below, that at which sticking of flux or ash oxides to surfaces of the pellets and to the lining of the kiln is avoided.

Figure 2:
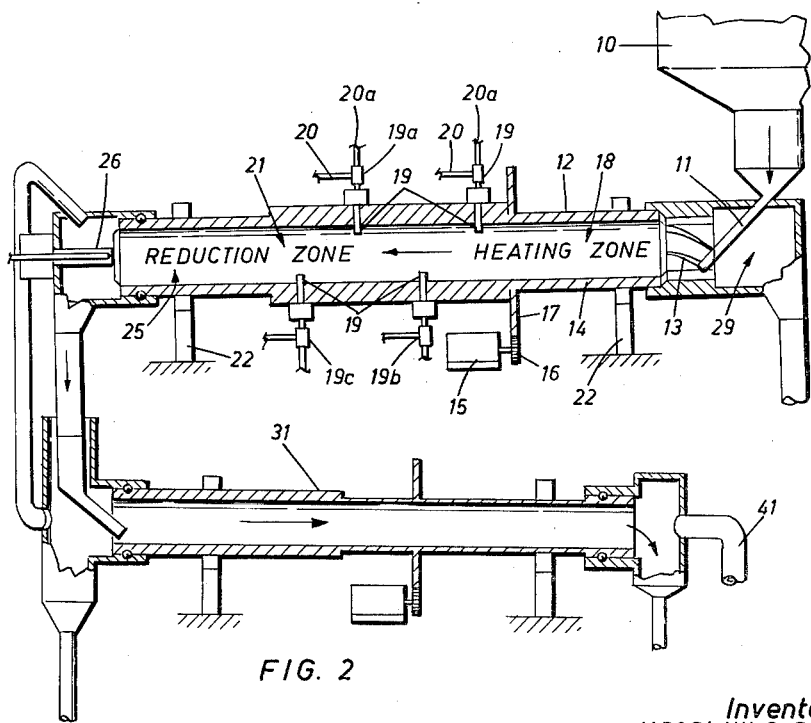
FIGURE 2 is a schematic view of a form of apparatus in which the reducing reaction can be conducted.

FIGURE 2 illustrates schematically an apparatus in which the above described process can be conducted. Charge mixture comprised of iron oxide pellets, solid carbonaceous material and flux are fed from a source of supply, such as a feed hopper 10, through a feed chute 11 to the feed end 13 of an elongated rotatable kiln.

The kiln is of circular section and can be of a conventional design such as a steel outer shell 12 with an inner lining of refractory material 14 such as fire clay, magnesite, chrome or the like. The kiln is supported on trunnions 22 according to conventional practice and is adapted to be rotated at a predetermined number of revolutions per minute or per hour, such as by a motor 15 through a train of speed reducing gears 16, the final one of which is meshed with a gear 17 secured around the shell 12. It can be mounted in a horizontal plane with provision for advancing the charge from the feed end to the discharge end, or it can be mounted at an angle to the horizontal to facilitate the flow of the charge mixture. Also, baffles can be provided, if desired, to facilitate the advancement of the charge mixture through the kiln. Suitable kiln constructions are known in the art and form no part of the present invention.

The charge mixture fed into the kiln advances to and through the heating zone 18 wherein it is heated to reaction temperature, preferably about 1100° C., either by the heat of the gas flowing in countercurrent to the flow of the charge, or by the provision of fuel from an extraneous source, or by a combination of both. Gas is preferred as the heating fuel but fuel oil can be employed, if desired.

The heated charge is advanced to the reduction zone 21 which is maintained at reaction temperature by combustion of solid carbonaceous matter supplemented by heating fuel introduced through burners 19 which are provided at spaced intervals along the length of the reduction and heating zones and axial burner 26 at the discharge end of the kiln. These burners are connected to a source of fuel by means of a valved supply line 20. Air necessary for the reactions is supplied through burners 19 and 26 by means of air supply line 20a. Also, the supply of supplemental heat to each burner 19 can be controlled within very narrow limits by regulating the valves 19a in lines 20 and 20a to supply from zero to maximum fuel and from zero to maximum air.

It will be understood that the gases fed into and formed in the kiln preferably should flow counter-current with the solids as illustrated in the drawing. Provision is made to pass exhaust gas out of the feed end 29 around the feed chute 11. The exhaust gas can be discharged to the atmosphere or, if desired, it can be collected for the recovery of any solid, gaseous or heat values contained therein.

The discharge end 25 of the kiln preferably is heated by an axially positioned fuel burner 26 which also is connected to sources of fuel and air supply.

The reaction mixture comprised of reduced iron-iron oxide pellets, ash oxides, unreacted carbon particles, and reacted and unreacted flux particles, is discharged from the discharge end 25 of the kiln. It is usually necessary to cool the reaction mixture to a temperature at which it can be handled conveniently by conventional equipment for the recovery of the desired iron-iron oxide pellets. Cooling should be effected under conditions which prevent re-oxidation of the pellets. A convenient procedure is illustrated in the drawing in which a strongly reducing atmosphere is maintained at the discharge end of the kiln. The reaction mixture is passed, in this reducing atmosphere, to a cooler 31 wherein it is cooled, in a reducing atmosphere, to about atmosphereic temperature, or at least to a temperature at which the pellets can be separated from the reaction mixture without danger of reoxidation. The cooler 31 can be of a conventional type, such as an externally cooled rotating kiln as illustrated. A reducing atmosphere can be maintained in the cooler 31, such as by feeding carbon monoxide from a source of supply, for example coke oven gas, to the cooler through conduit 41. Gas from the cooler can be passed, if desired, to the reduction or heating zone to be utilized as fuel.

The iron-iron oxide pellets can be separated from the reaction mixture discharged from the cooler 31, such as by screening or by a conventional separation process. The recovered pellets are either passed directly to an iron or steel making furnace or they can be passed to storage. It may be desirable to coat them with a protective film, such as graphite or lime, or both, which protects them from oxidation.

The temperature at which the reduction zone is maintained depends on the nature of the iron ore and the gangue material associated with it. The maximum reduction temperature can be determined readily by conventional tests having regard to the fact that it is desired to inhibit the formation of film of gangue material on the surfaces of the pellets and the sticking of particles of the charge on the wall of the kiln. In the treatment of the ore in the examples set out hereinafter, the reduction zone was maintained at a temperature within the range of from 950° C. to 1130° C.

The following examples illustrate results obtained in the operation of the process. In each example, the kiln employed was 30 feet long, 1.5 feet inside diameter and was rotated at one-third of a revolution per minute. The cooler was 20 feet long, 1 foot inside diameter and was rotated at speeds of about two-thirds of a revolution per minute.

The composition of the feed materials used was:

*Table 1*

|  | Percent $SiO_2$ | Percent $Al_2O_3$ | Percent $CaO$ | Percent $MgO$ | Percent S | Percent Fe | Percent F.C. | Percent Volatile | Percent $H_2O$ |
|---|---|---|---|---|---|---|---|---|---|
| Raw pellets | 1.63 | 0.29 | 1.37 | 0.20 | 0.003 | 66.80 |  |  |  |
| Anthracite coal | 0.86 | 0.79 | 0.14 | 0.15 | 1.00 | 0.94 | 86.30 | 9.30 | 0.90 |
| Dolomite | 1.60 | 0.55 | 32.86 | 16.00 | 0.15 | 0.74 |  |  | 0.08 |
| Limestone | 0.50 | 0.25 | 54.77 | 0.16 | 0.05 | 0.34 |  |  |  |
| City gas | 2.3% $CO_2$; 0.4% $O_2$; 9.3% CO; 50.1% $H_2$; 21.7% $CH_4$; 13.7% $N_2$; 2.5% $C_mH_n$. | | | | | | | | |

The iron oxide concentrate was pelletized. The pellets were heated in an oxidizing atmosphere on a travelling grate and the product was passed to the reduction kiln. The feed rate to the reduction kiln was maintained so as to result in a degree of filling of about 30% of the kiln capacity with a total residence time in the kiln of about 4 hours of which about 2½ hours was spent in passing through the reduction zone.

Various conditions of operation are set out in Table 2.

*Table 2*

Solid reductant:
    Coke—Particle size: minus 1 mm.
    Anthracite coal—Particle size: 0–1 mm.; 0–3 mm.;
        0–5 mm.; 0–10 mm.

Amounts used: 150%; 200%; 250%; 300%; of the theoretical amount required for reduction.

Pellets:
Particle size: minus 3 mm.; 6–8 mm.; 12–15 mm.; 20–25 mm.; 25–35 mm.

Dolomite:
Particle size: 1–3 mm.
Amounts used: 0%; 6%; 8%; 12% of the ore charged.

Limestone:
Particle size: minus 1 mm.; 1–3 mm.

Temperature in reduction zone:
950° C.; 1000° C.; 1050° C.; 1100° C.; 1130° C.

The tests were conducted with different combinations of particle sizes of charge components, amounts of additives in the charge, and temperatures. The conditions of each test were maintained substantially constant for the period of the test, for example, from 4 to 8 hours. The test periods were part of a continuous trial campaign which lasted from five to six days. The experiments were conducted over several campaigns. Purified coke oven gas was used, when necessary, as supplemental heat supplied to the burners 19 and 26. The charge input rate, the discharge rate, the volume of gas and air, as well as the volume and composition of the waste gases were measured on a continuous basis. The temperature profile of the kiln was continuously measured and maintained within pre-selected limits. The amount and particle size distribution of the solid discharge of the kiln were measured and its chemical composition was analyzed.

It was found that the most satisfactory reduced pellets produced in these tests contained from 90% to 94% iron. They had a sulphur content below about 0.03% and were free from adhering flux and fly ash. They were in ideal condition for charging into an iron or steel making furnace. The most satisfactory reduced pellets were obtained when the iron oxide pellets were from about 6 to about 15 mm. in size with at least 4% flux by weight of the ore charged of a particle size of from about 1 to about 3 mm.; and solid reductant of a particle size smaller than about 12 mm. and provided in amount sufficient to have in the discharge from the kiln at least 0.1 pound of carbon per pound of pellets charged, with the temperature maintained, for this particular ore, within the range of from about 1100° C. to 1130° C.

The process of the present invention possesses a number of important advantages. Iron oxide can be reduced to an iron-iron oxide product which is suitable for feeding to iron and steel making furnaces rapidly and at relatively low capital and operating costs. The sulphur content of the product can be reduced to and maintained at an acceptable percentage. The product is free, or substantially free, from contaminating impurities such as sulphidized flux and ash oxides. The process is relatively easily controlled to produce a product with any degree of reduction up to about 95% complete.

What we claim as new and desire to protect by Letters Patent of the United States is:

1. In a process for the reduction of iron oxide to a lower state of oxidation in an elongated rotatable kiln having a heating zone, a reduction zone and a discharging zone in which iron oxide is reacted in the solid state at elevated temperature with carbon monoxide in the presence of solid particles of carbonaceous matter and particles of a flux which comprises the steps of:

(a) feeding into the heating zone hard, coherent particles of iron oxide at least about 6 mm. in size, solid particles of carbonaceous matter smaller than about 12 mm. in size, and particles at least about 1 mm. in size of a flux selected from the group consisting of limestone and dolomite in amount greater than about 4%, by weight, of the iron oxide charged, said particles of carbonaceous matter being provided in amount less than that required for complete reduction of the iron oxide charged to metallic state and for maintaining the reduction zone of the furnace at reaction temperature but below that at which there is adhesion of particles of the charge mixture;

(b) advancing charge mixture to the reduction zone and reacting it therein with reducing gas flowing in counter-current to the charge mixture and formed at least in part by reaction between a free oxygen containing gas from an external source and carbon contained in said solid carbonaceous matter;

(c) supplying supplemental fuel from an external source at spaced intervals along the length of the kiln to provide at least part of the total amount of the fuel required to maintain the reduction zone at reaction temperature;

(d) supplying a free oxygen containing gas at spaced intervals along the length of the kiln in amount sufficient to provide oxygen for reaction with carbon contained in said solid carbonaceous matter to form carbon monoxide;

(e) continuing the reducing reaction in the kiln to reduce the iron content of said iron oxide to a reduced metallic iron-iron oxide reaction product;

(f) advancing charge mixture through the reduction zone to the discharging zone in counter-current to the flow of hot carbon monoxide containing reducing gas;

(g) discharging reacted charge mixture from the discharging zone;

(h) and separating reduced iron-iron oxide particles from the reacted charge mixture.

2. The process according to claim 1 in which the major portion of the carbonaceous material is of a particle size within the range of from about 12 to about 1 mm.

3. The process according to claim 1 in which the particles of iron oxide have dimensions within the range of from about 6 to about 15 mm.

4. In a process for the reduction of iron oxide to a lower state of oxidation in an elongated rotatable kiln having a heating zone, a reduction zone and a discharging zone in which iron oxide is reacted in the solid state at elevated temperature with carbon monoxide in the presence of solid particles of carbonaceous matter and particles of a flux which comprises the steps of:

(a) feeding into the heating zone hard, coherent particles of iron oxide at least about 6 mm. in size, solid particles of carbonaceous matter smaller than about 12 mm. in size, and particles at least about 1 mm. in size of a flux selected from the group consisting of limestone and dolomite in amount greater than about 4%, by weight, of the iron oxide charged, said particles of carbonaceous matter being provided in amount less than that required for complete reduction of the iron oxide charged to metallic state and for maintaining the reduction zone of the furnace at reaction temperature but below that at which there is adhesion of particles of the charge mixture;

(b) advancing charge mixture to the reduction zone and reacting it therein with reducing gas flowing in counter-current to the charge mixture and formed at least in part by reaction between a free oxygen containing gas from an external source and carbon contained in said solid carbonaceous matter;

(c) supplying supplemental fuel from an external source at spaced intervals along the length of the kiln to provide at least part of the total amount of the fuel required to maintain the reduction zone at reaction temperature;

(d) supplying a free oxygen containing gas at spaced intervals along the length of the kiln in amount sufficient to provide oxygen for reaction with carbon contained in said solid carbonaceous matter to form carbon monoxide;

(e) continuing the reducing reaction in the kiln to reduce the iron content of said iron oxide to a reduced metallic iron-iron oxide reaction product;

(f) advancing charge mixture through the reduction zone to the discharging zone in counter-current to the flow of hot carbon monoxide containing reducing gas;

(g) discharging reacted charge mixture from the discharging zone;

(h) cooling the reacted charge mixture in a reducing atmosphere;

(i) and separating reduced iron-iron oxide particles from the reacted charge mixture.

5. The process according to claim 4 in which reducing gas is passed from the cooling zone to the reaction zone.

6. In a process for the reduction of iron oxide to a lower state of oxidation in an elongated rotatable kiln having a heating zone, a reduction zone and a discharging zone in which iron oxide is reacted in the solid state at elevated temperature with carbon monoxide in the presence of solid particles of carbonaceous matter and particles of a flux which comprises the steps of:

(a) feeding into the heating zone hard, coherent particles of iron oxide at least about 6 mm. in size, solid particles of carbonaceous matter smaller than about 12 mm., and particles at least about 1 mm. in size of a flux selected from the group consisting of limestone and dolomite in amount greater than about 4%, by weight, of the iron oxide charged, said particles of carbonaceous matter being provided in amount less than that required for complete reduction of the iron oxide charged to the metallic state and for maintaining the temperature of the reduction zone within the range of from about 950° C. to about 1130° C.;

(b) advancing charge mixture to the reduction zone and reacting it therein with reducing gas flowing in counter-current to the charge mixture and formed at least in part by reaction between a free oxygen containing gas from an external source and carbon contained in said solid carbonaceous matter;

(c) supplying supplemental fuel from an external source at spaced intervals along the length of the kiln to provide at least part of the total amount of the fuel required to maintain the reduction zone at reaction temperature;

(d) supplying a free oxygen containing gas at spaced intervals along the length of the kiln in amount sufficient to provide oxygen for reaction with carbon contained in said solid carbonaceous matter to form carbon monoxide;

(e) continuing the reducing reaction in the kiln to reduce the iron content of said iron oxide to a reduced metallic iron-iron oxide reaction product;

(f) advancing charge mixture through the reduction zone to the discharging zone in counter-current to the flow of hot carbon monoxide containing reducing gas;

(g) discharging reacted charge mixture from the discharging zone;

(h) and separating reduced iron-iron oxide particles from the reacted charge mixture.

References Cited in the file of this patent
UNITED STATES PATENTS

| | | |
|---|---|---|
| 2,495,225 | Buehl et al. | Jan. 24, 1950 |
| 2,829,042 | Moklebust | Apr. 1, 1958 |
| 2,855,290 | Freeman | Oct. 7, 1958 |